United States Patent
Park et al.

(10) Patent No.: US 6,847,413 B2
(45) Date of Patent: Jan. 25, 2005

(54) LIQUID CRYSTAL DISPLAY DEVICE AND METHOD FOR MANUFACTURING THE SAME

(75) Inventors: Dae Lim Park, Kyongsangbuk-do (KR); Seong Soo Hwang, Kumi-shi (KR); Young Sik Kim, Kyongsangbuk-do (KR); Su Hwan Moon, Kumi-shi (KR)

(73) Assignee: LG. Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/322,706

(22) Filed: Dec. 19, 2002

(65) Prior Publication Data

US 2003/0122985 A1 Jul. 3, 2003

(30) Foreign Application Priority Data

Dec. 28, 2001 (KR) ........................................ 2001-86758

(51) Int. Cl.[7] .............................................. G02F 1/133
(52) U.S. Cl. .......................................................... 349/43
(58) Field of Search .................................... 349/43, 113

(56) References Cited

U.S. PATENT DOCUMENTS 6,414,730 B1 * 7/2002 Akamatsu et al. ............. 349/43
6,567,136 B1 * 5/2003 Sakuramoto et al. ......... 349/43

FOREIGN PATENT DOCUMENTS

JP    11-133450    5/2004
JP    11-249171    5/2004

* cited by examiner

Primary Examiner—James A. Dudek
(74) Attorney, Agent, or Firm—Birch, Stewart, Kolasch & Birch, LLP

(57) ABSTRACT

A liquid crystal display device and a method for manufacturing the same are provided. The device and method increase contact stability by forming a contact hole exposing the lateral and upper surfaces of a metal layer using a diffraction mask. The device includes a lower metal layer on a substrate; a passivation layer on the substrate including the lower metal layer; a contact hole on the passivation layer so as to expose the lateral and upper surfaces of the lower metal layer; and an upper metal layer in the contact hole and over the passivation layer, and in contact with the exposed lateral and upper surface of the lower metal layer.

14 Claims, 10 Drawing Sheets

LIQUID CRYSTAL DISPLAY DEVICE AND METHOD FOR MANUFACTURING THE SAME

This application claims the benefit of the Korean Patent Application No. P2001-86758 filed on Dec. 28, 2001, which is hereby incorporated by reference.

BACKGROUND OF THE INVENTION

1. Field of the Invention

The present invention relates to a liquid crystal display device, and more particularly, to a liquid crystal display (LCD) device and a method for manufacturing the LCD device to increase contact stability by increasing a contact area when a contact hole is formed on a surface of a metal layer using a diffraction mask.

2. Discussion of the Related Art

As information society develops, the demand for various displays increases. Recently, many efforts have been made to research and develop various flat display panels such as LCDs (liquid crystal displays), PDPs (plasma display panels), ELDs (electroluminescent displays), VFDs (vacuum fluorescent displays), and the like. And, some species of the flat display panels are already applied to the displays of various equipments.

LCD is widely used because of the characteristics or advantages of high quality image, lightness, thin & compact size, and low power consumption. Thus, it is used as a substitution for a CRT (cathode ray tube) as a mobile image display. The LCD is also developed to be applicable to devices receiving broadcasting signals, such as televisions, computer monitors, and the like.

Even if various technical developments of LCD have been made to play a role as an image display in various fields, the image quality for an image display fails to meet the characteristics and advantages of LCD.

In order to apply a liquid crystal display device as a general display device to various fields, the development of LCD depends on realizing a high quality image of high resolution, high brightness, wide screen, and the like as well as maintaining the characteristics of lightness, thin compactness, and low power consumption.

A general liquid crystal display includes two substrates having an electric field generating electrodes formed thereon respectively to confront each other, and liquid crystals injected between the two confronting substrates. If a voltage is applied to the electrodes to generate an electric field, liquid crystals molecules are driven to display an image in accordance with the light transmittance varied by the electric field.

There are various types of the liquid crystal displays. And, great attention is paid to an active matrix liquid crystal display (AM-LCD) on which thin film transistors and pixel electrodes connected to each other are arranged by a matrix system to provide excellent resolution and implementation of moving pictures.

Such a liquid crystal display has a structure where pixel and common electrodes are formed on lower and upper substrates, respectively, and drives liquid crystal molecules by applying an electric field between the substrates in a direction vertical to the substrates.

A liquid crystal display according to a related art is explained by referring to the attached drawings as follows.

Referring to FIG. 1, a plurality of gate lines 11 are formed in one direction on a lower array substrate 10 of a liquid crystal display, and a gate electrode 12 protruding from one side of each of the gate lines 11 is formed. A gate pad 11a is formed at one end of each gate line 11 with a predetermined area. A gate insulating layer 22 (shown in FIG. 2) is formed on an entire surface of the lower array substrate 10 including the gate lines 11, the gate electrodes 12 and the gate pad 11a.

A plurality of data lines 14 are formed perpendicular to the gate lines 11, and cross the gate lines 11 to define pixel areas, respectively. A source electrode protrudes from one side of each of the data lines 14, and a drain electrode 16 is separated from the source electrode 15 to leave a predetermined interval. A data pad 14b having a contact hole 17c is formed at one end of each data line 14 with a predetermined area.

Moreover, the source, drain, and gate electrodes 15, 16, and 12 construct a thin film transistor T including an active layer of amorphous silicon over the gate electrode 12.

The source and drain electrodes 15 and 16 are overlapped with both upper sides of the gate electrode 12.

A pixel electrode 18 made of a transparent conductive material is formed on each of the pixel areas to be overlapped with the drain electrode 16 in part, and a contact hole 17 is formed at the portion where the pixel and drain electrodes 18 and 16 are overlapped with each other.

Meanwhile, a storage capacitor Cst is formed to maintain a cell voltage.

In this case, an upper electrode of the storage capacitor Cst is made of an opaque metal layer 14a having a predetermined pattern and a lower electrode of the storage capacitor Cst is made of the gate line 11 on a front end.

The opaque metal layer 14a is overlapped with the gate line 11 on the front end in part when the data line 14 is formed, and is overlapped with the pixel electrode 18 in part as well.

And, a contact hole 17a exposing a predetermined portion of the opaque metal layer 14a is formed together with the contact hole 17. Hence, the gate line 11, the opaque metal layer 14a, and an insulating layer inserted between the gate line 11 and opaque metal layer 14a, construct the storage capacitor Cst when a voltage is applied to the pixel electrode 18. During the formation of the contact holes 17 and 17a, a process step for exposing a portion of the gate pad 11a is performed with a process step for etching a passivation layer 24 and a gate insulating layer 22.

A storage-on-gate system is shown in the drawing, and has the structure where the lower electrode of the storage capacitor is built in one body with the gate line on the front end.

A cross-sectional view of such an array substrate is shown in FIG. 2 illustrating a cross-sectional view along cutting lines V–V' and VI-VI' in FIG. 1, in which a storage electrode part A, a thin film transistor (TFT) part B and a gate pad part C are separated from one another for explanation. The same elements are indicated by the same reference numerals.

Referring to FIG. 2, a gate line 11 is formed in the storage electrode part A on a lower array substrate 10 and a gate electrode 12 extending from the gate line 11 is formed in the thin film transistor part B. A gate insulating layer 22 is formed on an entire surface of the storage electrode and thin film transistor parts A and B.

An active layer 13 is formed in a thin film transistor forming area on the gate insulating layer 22 of the thin film transistor part B. The active layer 13 includes an amorphous silicon layer 13a and a doped semiconductor layer 13b formed on the amorphous silicon layer 13a for ohmic contact and etch prevention.

Source and drain electrodes 15 and 16 are arranged to overlap with both side ends of the doped semiconductor layer 13b, respectively. In this case, the source electrode 15 is an electrode extending from the data line 14, and the drain electrode 16 is spaced apart from the source electrode 15.

An opaque metal layer 14a overlapped with the gate line 11 is formed in the storage electrode part A simultaneously when the source and drain electrodes 15 and 16 are formed. The gate pad 11a is formed in the gate pad part C, and the gate insulating layer 22 is formed on the lower array substrate 10 including the gate pad 11a.

A passivation layer 24 is formed on the entire surface of the lower array substrate 10 having the opaque metal layer 14a, source and drain electrodes 15 and 16 and gate pad 11a.

Contact holes 17, 17a and 17b exposing predetermined portions of the drain electrode 16, the opaque metal layer 14a, and the gate pad 11a are respectively formed in the passivation layer 24. And, a pixel electrode 18 made of a transparent material is formed on the passivation layer 24 in the pixel area so as to be in contact with the drain electrode 16 and the opaque metal layer 14a. A transparent material 18a is also formed in the hole 17b to be in contact with the gate pad 11a.

In the fabrication of the above-constituted liquid crystal display device, the metal layer for the source and drain electrodes 15 and 16 includes Mo instead of Cr.

FIG. 3 illustrates a cross-sectional view of a liquid crystal display device to which a storage-on-gate system is applied using Mo as the source and drain electrodes 15 and 16.

Referring to FIG. 3, in the process of forming the contact holes 17 and 17a by dry-etching the passivation layer 24 and thereby exposing upper portions of the opaque metal layer 14a and the drain electrode 16 after the passivation layer 24 has been formed, Mo fails to have etch selectivity with the etchant gas of the passivation layer 24. Hence, the opaque metal layer 14a and drain electrode 16 made of Mo may be etched since the gate pad 11a being formed at one end of the gate line 11 is exposed during the formation of the contact holes 17 and 17a. That is, since it is required to etch the gate insulating layer 22 as well as the passivation layer 24 in order to expose the gate pad 11a, the opaque metal layer 14a and the drain electrode 16 are also simultaneously etched because the opaque metal layer 14a and the drain electrode 16 are made of Mo having low etch selectivity and are exposed during the formation of the contact holes 17 and 17a.

If portions of the opaque metal layer 14a and drain electrode 16 are etched away when the contact holes 17 and 17a are formed, the pixel electrode 18 would likely come into contact with only the exposed lateral sides of the opaque metal layer 14a and drain electrode 16 as shown in the dotted circles of FIG. 3.

Thus, if a contact area of the opaque metal layer 14a and/or drain electrode 16, which is contacted with the pixel electrode 18, decreases as shown in FIG. 3, a contact resistance of the LCD device increases which in turn causes PDs (point defects) in the LCD devices.

SUMMARY OF THE INVENTION

Accordingly, the present invention is directed to a liquid crystal display device and a method of manufacturing the same that substantially obviates one or more problems due to limitations and disadvantages of the related art.

An object of the present invention is to provide a liquid crystal display device and a method of manufacturing the same to increase contact stability by forming a contact hole exposing both the lateral and upper surfaces of a metal layer using a diffraction mask.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a liquid crystal display device according to an embodiment of the present invention includes a lower metal layer on a substrate; a passivation layer on the substrate including the lower metal layer; a contact hole on the passivation layer so as to expose lateral and upper surfaces of the lower metal layer; and an upper metal layer on the contact hole and the passivation layer adjacent to the contact hole for being in contact with the lateral and upper surfaces of the lower metal layer.

In one embodiment, the lower metal layer is made of Mo.

In one embodiment, the lower metal layer of which the lateral and upper surfaces are exposed is used as a drain electrode of the liquid crystal display device, and as an upper electrode of a storage capacitor in the liquid crystal display device.

In another aspect of the present invention, a method of manufacturing a liquid crystal display device, includes the steps of forming a metal layer on an insulating layer; forming a passivation layer on the metal layer; forming a step-like photoresist pattern having an opening exposing a predetermined portion of the passivation layer and having at least two areas differing in thickness from each other; forming a contact hole exposing lateral and upper surfaces of the metal layer by etching the passivation layer using the photoresist pattern as an etch mask; removing the photoresist pattern; and forming a transparent conductive material to be in contact with the exposed metal layer through the contact hole.

In another aspect of the present invention, a method of manufacturing a liquid crystal display device, includes the steps of forming a gate line on a substrate; forming an insulating layer on the substrate including the gate line; forming a semiconductor layer on the insulating layer over the gate line; forming source and drain electrodes to be overlapped with both sides of the semiconductor layer and simultaneously forming an opaque metal layer to be overlapped with the gate line on a front end; forming a step-like photoresist pattern having openings exposing predetermined portions of the passivation layer over the drain electrode and the opaque metal layer respectively wherein the step-like photoresist pattern has two areas differing in thickness from each other; forming first and second contact holes exposing lateral and upper surfaces of the opaque metal layer and the drain electrode respectively by etching the passivation layer using the photoresist pattern as an etch mask; removing the photoresist pattern; and forming a transparent conductive material to be contacted with the opaque metal layer and the drain electrode exposed through the first and second contact holes, respectively.

In one embodiment, the opaque metal layer, source electrode, and drain electrode are formed of Mo.

In one embodiment, the step of forming the photoresist pattern includes the steps of coating a photoresist layer on the passivation layer; applying UV-rays to the photoresist layer using a diffraction mask having a predetermined slit pattern; and developing the photoresist layer.

In one embodiment, the passivation layer is etched by a ($SF_6+Cl_2$) gas having an $O_2$ gas added thereto.

In one embodiment, the photoresist pattern under the slit pattern is thinner than other areas of the photoresist pattern.

In one embodiment, the thinner photoresist pattern is etched simultaneously when the passivation layer is etched.

In another aspect of the present invention, a method of manufacturing a liquid crystal display device, includes the steps of forming a gate line on a substrate; forming an insulating layer on the substrate including the gate line; forming a semiconductor layer on the insulating layer over the gate line; forming source and drain electrodes to be overlapped with both sides of the semiconductor layer; forming an opaque metal layer to be overlapped with the gate line on a front end; forming a passivation layer on the substrate including the source and drain electrodes and the opaque metal layer; forming a photoresist pattern being thinner on the passivation layer of first and second areas than on the passivation layer of other areas; forming first and second contact holes for exposing the opaque metal layer and the drain electrode corresponding to the first and second areas by using the photoresist pattern as a mask; removing the remaining photoresist pattern; and forming a transparent conductive material to be in contact with the opaque metal layer and the drain electrode exposed through the first and second contact holes, respectively.

In one embodiment, the step of forming the photoresist pattern includes the steps of coating a photoresist layer on the passivation layer; performing exposing and developing process to the photoresist layer using a diffraction mask having a predetermined slit pattern; and removing the photoresist layer of the first and second areas at a predetermined thickness.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 4:
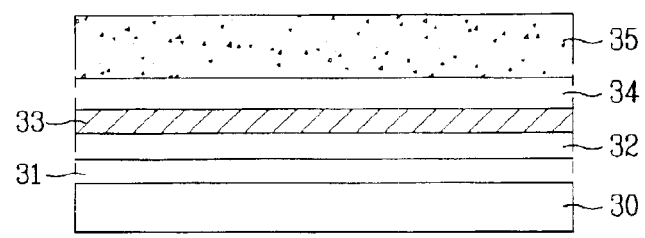
FIGS. 4 to 6 illustrate cross-sectional views of layers for explaining a method of forming a contact hole in a storage capacitor area and/or a TFT area of a liquid crystal display device according to the embodiments of the present invention.
Figure 5:
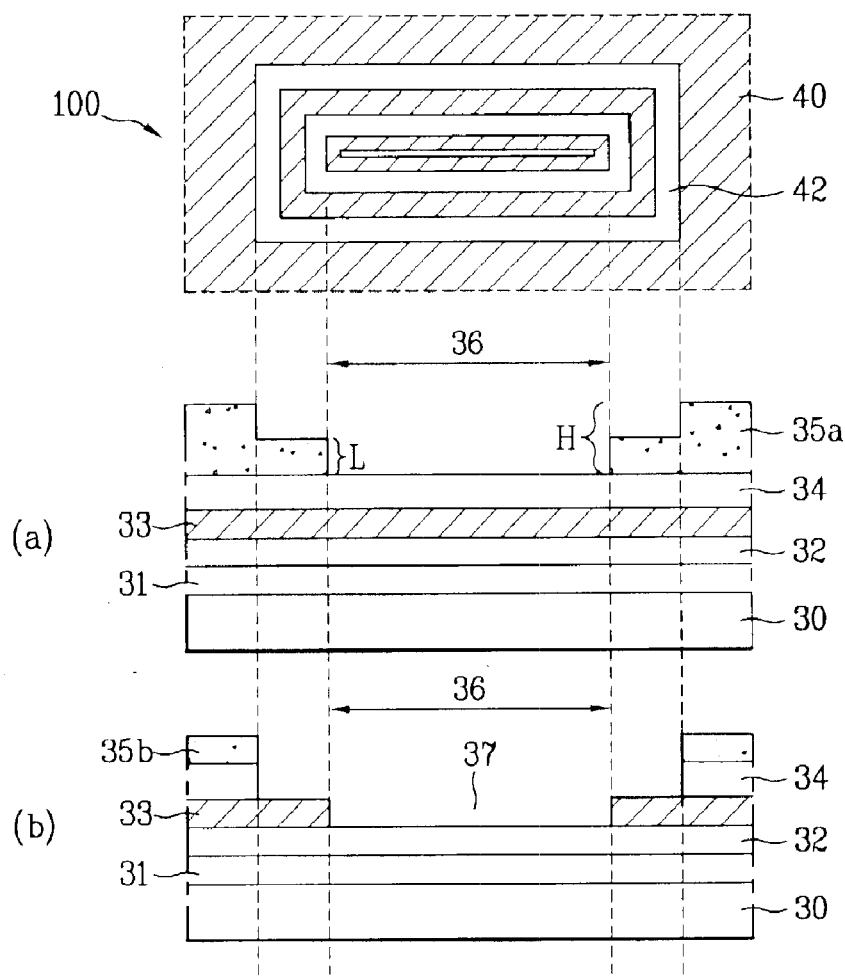
Figure 6:
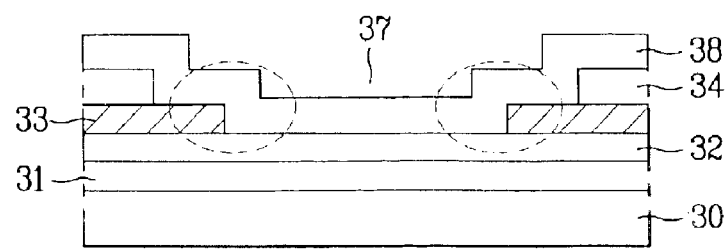

FIGS. 4 to 6 illustrate cross-sectional views of layers for explaining a method of forming a contact hole in a storage capacitor area and/or a TFT area of a liquid crystal display device according to an embodiment of the present invention. The liquid crystal display device according to the present invention will be explained as follows.

First, a lower metal layer is formed on a substrate, and a passivation layer is formed on the substrate including the lower metal layer. Then, contact holes are formed on the passivation layer for exposing certain lateral and upper surfaces of the lower metal layer. An upper metal layer of a transparent conductive material is formed in the contact hole and over the passivation layer adjacent to the contact hole, and is in contact with both the exposed lateral and upper surfaces of the lower metal layer. At this time, the lower metal layer, of which the lateral and upper surfaces are exposed, may be used as the drain electrode of the liquid crystal display device, and/or the upper electrode of the storage capacitor.

More specifically, FIG. 6 illustrates a cross-sectional view of the upper electrode of the storage capacitor (or the drain electrode area) in the liquid crystal display device according to an embodiment of the present invention.

Referring to FIG. 6, a first metal layer 31 is formed on a substrate 30, and an insulating layer 32 is formed on the first metal layer 31. A second metal layer 33 is formed on the insulating layer 32, and a passivation layer 34 is formed on the second metal layer 33. A contact hole 37 is formed through the passivation layer 34 and the second metal layer 33 by removing portions of the second method layer 33 and the passivation layer 34. This exposes lateral and upper surfaces of the second metal layer 33 by exposing a predetermined area of the insulating layer 32. Then, a transparent conductive material 38 is formed in the contact hole 37 and over the passivation layer 34 adjacent to the contact hole 37, that it contacts the exposed lateral and upper surfaces of the second metal layer 33. In this example, the first metal layer 31 is used as a lower electrode of the storage capacitor, the insulating layer 32 is used as a gate insulating layer, the second metal layer 33 is used as an upper electrode of the storage capacitor, and the transparent conductive material 38 is used as a pixel electrode.

The method of forming a contact hole in a storage capacitor forming area of a liquid crystal display having the aforementioned structure of FIG. 6 is explained by referring to FIGS. 4–6 as follows according to an embodiment of the present invention.

Referring to FIG. 4, the first metal layer 31 as an opaque metal layer is deposited on the substrate 30.

After the insulating layer 32 has been formed on the first metal layer 31, the second metal layer 33, the passivation layer 34, and the photoresist layer 35 are formed successively on the insulating layer 32.

In this case, the first metal layer 31, the insulating layer 32, and the second metal layer 33 are for forming a gate line, a gate insulating layer, and source/drain electrodes and a data line, respectively. The first and second metal layers 31 and 33 are patterned by photolithography or other suitable techniques.

The process of patterning the layers of FIG. 4 to form the structure of FIG. 6 is as follows. Referring to (a) of FIG. 5, UV-rays are applied to the photoresist layer 35 using a diffraction mask 100 having a predetermined slit pattern.

The photoresist layer 35 is then developed to form a photoresist pattern 35a having an opening 36 exposing a predetermined portion of the passivation layer 34. The photoresist pattern 35a has a varying thickness. Namely, the photoresist pattern 35s has two step-like profiles as shown in FIG. 5(a), where the opening 36 is defined through these two step-like profiles.

The diffraction mask 100 is prepared by forming a slit pattern 42 on a Cr layer 40 functioning as a photo-blocking layer, and is used to form the photoresist pattern 35a having certain areas differing in thickness due to diffractions between the slits when the UV-rays are applied to the photoresist pattern 35a through the mask 100.

In this case, a thin area of the photoresist pattern 35a is indicated by 'L' and a relatively thicker area of the photoresist pattern 35a is represented by 'H'.

Thereafter, referring to (b) of FIG. 5, the passivation layer 34 is then etched using the photoresist pattern 35a as an etch mask. In this case, the second metal layer 33 is formed of Mo but has a low etch selectivity with a gas for etching the passivation layer 34.

Hence, the second metal layer 33 under the opening 36 of the photoresist pattern 35a may be etched simultaneously when the passivation layer 34 is etched. Although not shown, this is caused when the gate pad protruding from one end of the gate line is simultaneously exposed during the formation of the contact hole 37. That is, it is required to etch the gate insulating layer as well as the passivation layer in order to expose the gate pad. At this time, the second metal layer 33 made of Mo having the low etch selectivity is etched during the formation of the contact hole 37.

In this case, the thin area L of the photoresist pattern 35a starts to be etched simultaneously when the portion of the passivation layer 34 corresponding to the opening 36 is etched. And, the thin area L of the photoresist pattern 35a plays a role as an etch-protecting layer to prevent certain portions of the second metal layer 33 from being etched, i.e., the remaining portions of the second metal layer 33.

After the etching process for a certain time period has ended, the photoresist pattern 35b remains as shown in FIG. 5(b), which is then removed.

In this example, the etchant used includes a ($SF_6$–$Cl_2$) gas having a predetermined quantity of an $O_2$ gas added thereto.

Referring to FIG. 6, after the remaining photoresist pattern 35b has been removed, a transparent conductive material 38 is formed on the patterned passivation layer 34, the patterned second metal layer 33, and the insulating layer 32. As a result, the conductive material 38 contacts both the exposed lateral and upper surfaces of the patterned second metal layer 33.

This increases the contact area between the second metal layer 33 and the transparent conductive layer 38 in the contact hole area, whereby it reduces or minimizes PDs (point defects) of the LCD device significantly.

The above-explained method of forming the contact hole is applicable to a drain electrode area in a liquid crystal display device as well as the storage capacitor forming area. Hereinafter, embodiments applying the above teachings for forming a contact hole, to each of the drain electrode area and the storage capacitor forming area are explained in the following description.

First Embodiment

Figure 1:
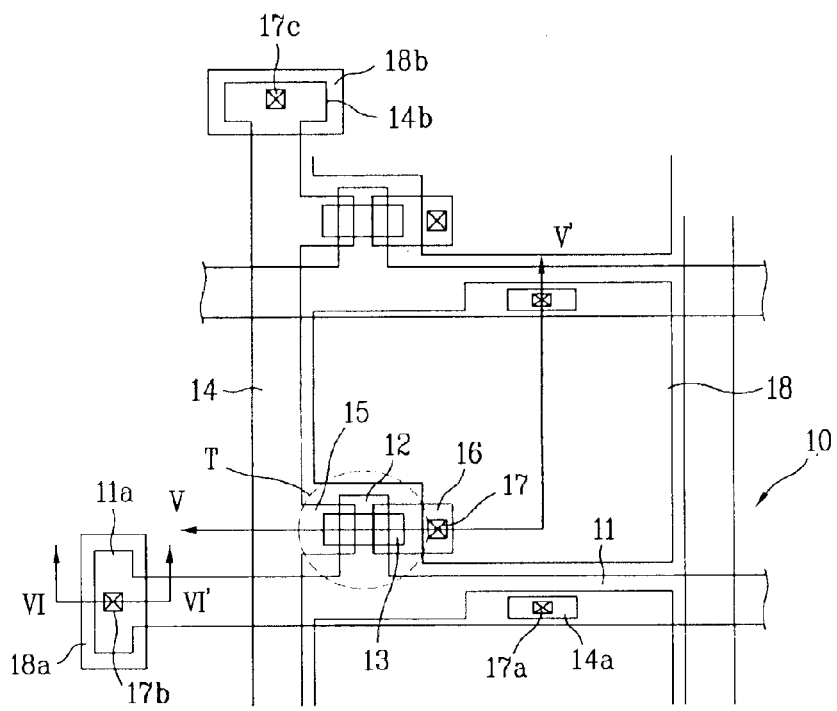
FIG. 1 illustrates a layout of a liquid crystal display device according to a related art.
Figure 2:
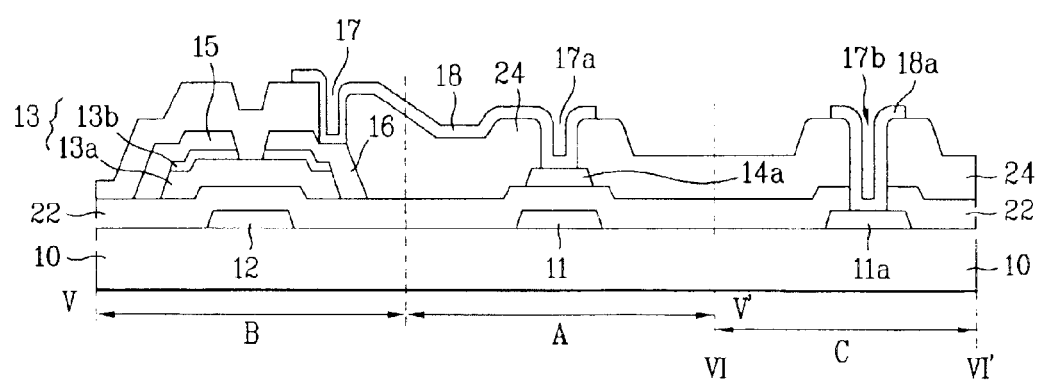
FIG. 2 illustrates a cross-sectional view of the liquid crystal display device in FIG. 1.
Figure 3:
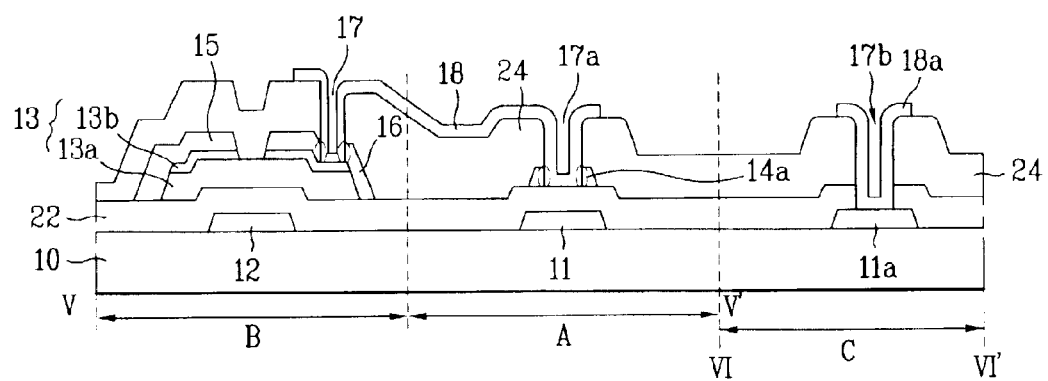
FIG. 3 illustrates a cross-sectional view for explaining a problem of a liquid crystal display according to a related art.

FIGS. 8A to 8E illustrate cross-sectional views of an LCD device of the present invention cut along similarly to lines V–V' and VI–VI' of FIG. 1, for explaining a method of manufacturing a liquid crystal display device according to a first embodiment of the present invention.

Figure 8A:
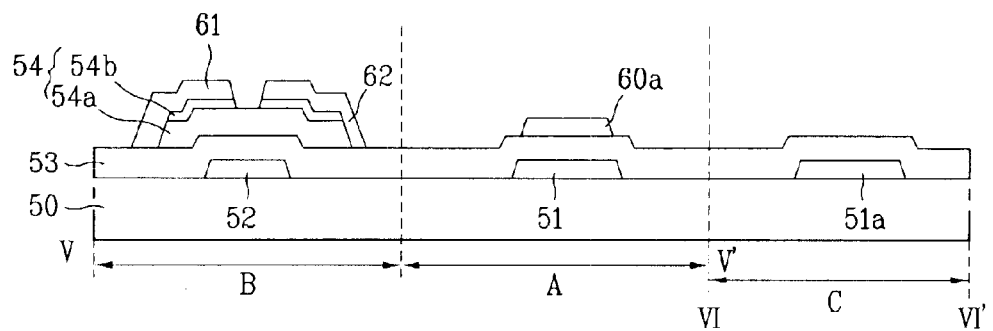
FIGS. 8A to 8E illustrate cross-sectional views of a method of manufacturing a liquid crystal display device according to the first embodiment of the present invention.

Referring to FIG. 8A, a first metal layer is deposited on a lower array substrate 50 of an LCD device, and then a plurality of gate lines 51 are formed in one direction in a storage electrode part A by using photolithography or other suitable techniques.

In this case, a gate electrode 52 is formed to protrude from one side of the gate line 51 in a thin film transistor part B. A gate pad 51a having a predetermined area is formed at one end of each of the gate lines 51.

An insulating layer 53 is formed on the entire surfaces of the storage electrode part A, the thin film transistor part B, and the gate pad 51a in this case, the insulating layer 53 is a gate insulating layer.

Subsequently, a semiconductor layer 54 is formed on the insulating layer 53 over the gate electrode 52 in the thin film transistor part B. The semiconductor layer 54 is formed by depositing an amorphous silicon layer 54a and a doped amorphous silicon layer 54b in that order and patterning the deposited amorphous silicon layer 54a and the doped amorphous silicon layer 54b.

And, a source electrode 61 extending from a data line and a drain electrode 62 are formed to be overlapped with both ends of the doped amorphous silicon layer 54b, respectively. The data line crosses perpendicularly to the gate line to define a pixel area as known.

The source electrode 61 is formed to extend from the data line 61. The drain electrode 62 is separated from the source electrode 61 with a predetermined interval to be overlapped with one side of the gate electrode 52.

Simultaneously, an opaque transparent metal layer 60a is formed in the storage electrode part A to be overlapped with the gate line 11 on a front end when the source and drain electrodes 61 and 62 are formed. Then, a data pad having a predetermined area is formed at one end of the data line. In this example, the source electrode 61, drain electrode 62, data line, and opaque metal layer 60a are formed of Mo. But in other examples, different material(s) may be used.

Figure 8B:
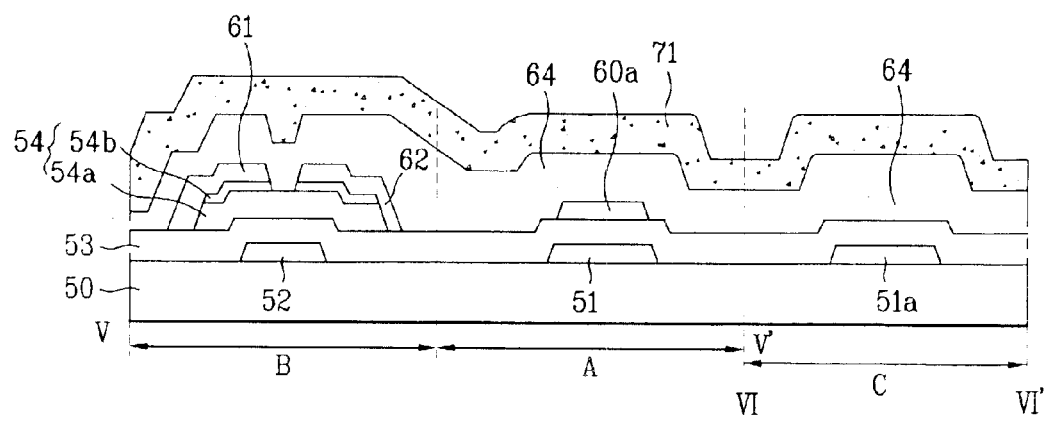

Referring to FIG. 8B, a passivation layer 64 and a photoresist layer 71 are successively formed on the entire surface of the substrate having the opaque metal layer 60a, the source and drain electrode 61 and 62, and a gate pad 51a formed thereon.

Subsequently, UV-rays or other suitable light beams are applied to the photoresist layer 71 using a diffraction mask having a predetermined slit pattern. In this example, the diffraction mask used may be, in part, the diffraction mask 100 shown in FIG. 5. The diffraction mask of varying slit patterns may be used as long as it incorporates patterning teachings of the above as discussed in FIG. 5.

Figure 8C:
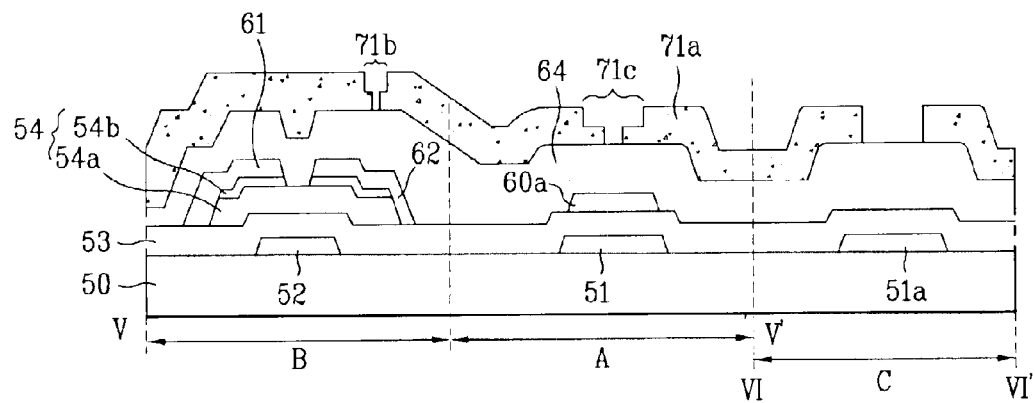

Referring to FIG. 8C, the photoresist layer 71 is developed to form a photoresist pattern 71a having openings exposing predetermined portions of the passivation layer 64.

The photoresist pattern 71a has a varying thickness. Namely, the photoresist pattern 71a has step-like profiles 71b and 71c.

In other words, the thickness of the photoresist pattern 71a under the slit pattern of the diffraction mask is smaller than that of the rest of the photoresist pattern 71a.

In this case, the openings of the photoresist pattern 71a are formed over the drain electrode 62 and the opaque metal layer 60a.

The diffraction mask is prepared by forming a slit pattern on a Cr layer as a photo-blocking layer, and is used to form the photoresist pattern 71a having the areas differing in thickness due to diffractions between the slits when the UV-rays are applied to the photoresist layer 71 thru the diffraction mask.

The photoresist pattern 71a formed above the gate pad 51a is formed so as to expose a portion of the passivation layer 64.

Figure 8D:
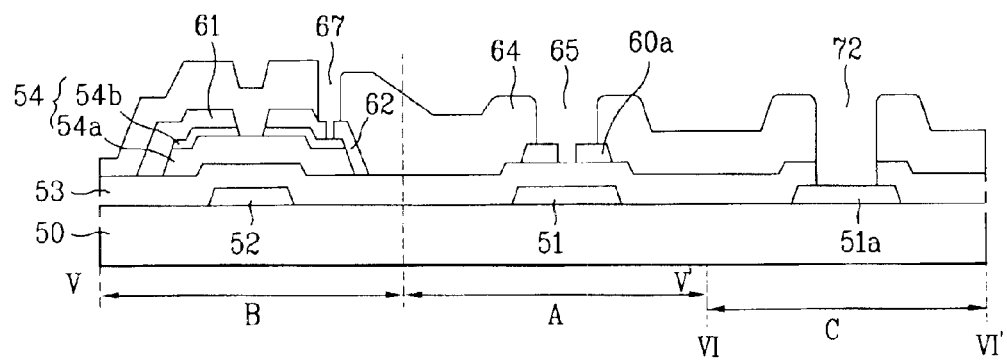

Referring to FIG. 8D, the passivation layer 64 is etched using the photoresist pattern 71a (of FIG. 8C) as an etch mask to form first, second and third contact holes 65, 67 and 72.

In this example, the drain electrode 62 and the opaque metal layer 60a are formed of Mo, so that portions of the drain electrode 62 and the opaque metal layer 61a may be etched when etching the passivation layer 64. The third contact hole 72 is formed so as to expose the gate pad 51a being formed at one end of the gate line during the formation of the first and second contact holes 65 and 67. In other words, since it is required to etch the insulating layer 53 as well as the passivation layer 64 in order to expose the gate pad 51a in the part C, portions of the opaque metal layer 60a and the drain electrode 62 are simultaneously etched because the opaque metal layer 60a and the drain electrode 62 are made of Mo having a low etch selectivity and are exposed during the formation of the first and second contact holes 65 and 67.

In this case, the thin area of the photoresist pattern 71a starts to be etched simultaneously when exposed portions of the passivation layer 74 are etched. And, this thin area of the photoresist pattern 71a plays a role as an etch-protecting layer to prevent certain portions of the opaque metal layer 60a and the drain electrode 62 from being etched as shown in FIG. 8D.

The first contact hole 65 is formed on the opaque metal layer 60a in the storage electrode part A, while the second contact hole 67 is formed on the drain electrode 62 in the thin film transistor part B.

Once the patterning using the photoresist pattern 71b is finished, the photoresist pattern 71a is removed.

In this embodiment, the etchant gas for etching the passivation layer 64 includes a ($SF_6+Cl_2$) gas having a predetermined quantity of an $O_2$ gas added thereto.

Figure 8E:
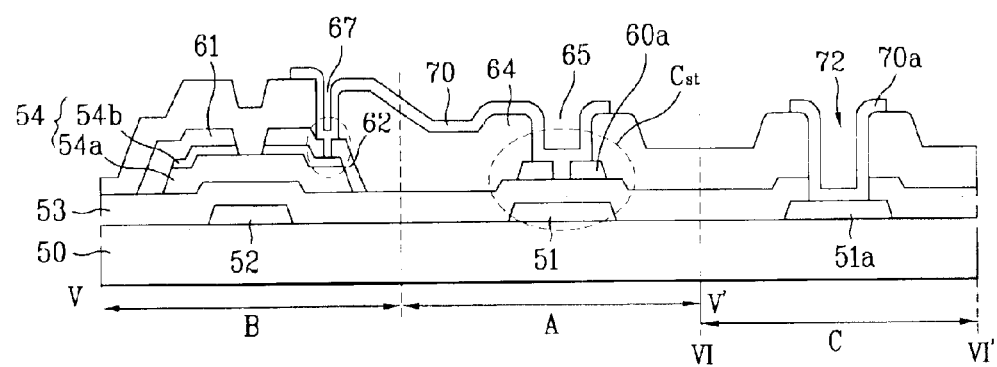
Figure 9:
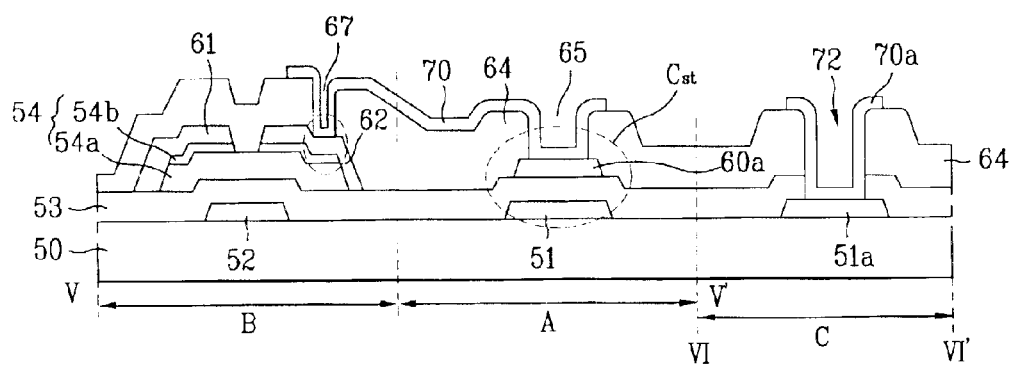
FIG. 9 illustrates a cross-sectional view of a liquid crystal display device according to a second embodiment of the present invention.

Referring to FIG. 8E, after the remaining photoresist pattern 71a has been removed, a transparent conductive material is formed on the passivation layer 64, the opaque metal layer 60a, and the insulating layer 53 through the holes 67, 65 and 72. The deposited transparent conductive material is then patterned to form a pixel electrode 70 in the pixel area, and to from a transparent conductive layer 70a on the gate pad 51a.

In this case, the pixel electrode 70 and the transparent conductive layer 70a are formed of ITO(indium tin oxide) or other suitable materials.

In the above-explained embodiment of the present invention, the photoresist pattern is formed to have areas differing in thickness from each other using the diffraction mask and then the passivation layer 64 is etched using the photoresist pattern. The patterned passivation layer 64 exposes at least some parts of both the lateral and top surfaces of the drain electrode 62 and the opaque metal layer 60a. Hence, both contact areas between the pixel electrode 70 and the drain electrode 62 and between the opaque metal layer 60a and the pixel electrode 70 are increased, which decreases the contact resistance. Therefore, the present invention reduces or removes PDs (point defects) such as spots, weak spots, and the like caused by the increased Mo/ITO contact resistance in the related art LCD devices.

Figure 7:
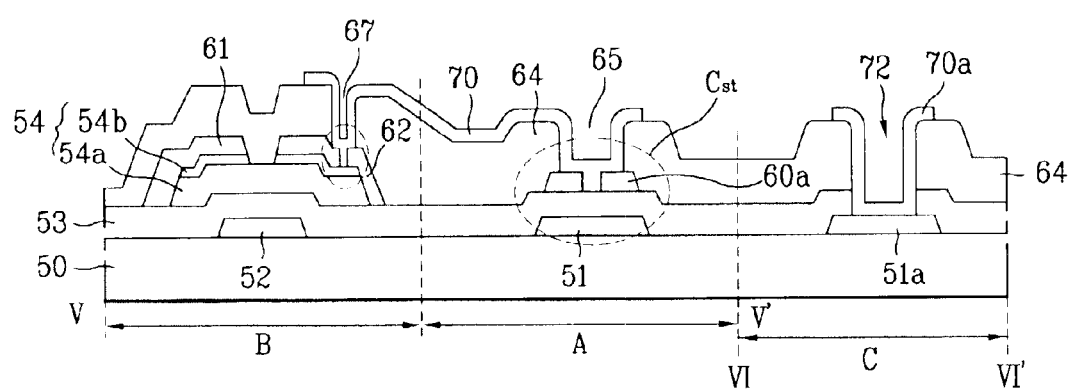
FIG. 7 illustrates a cross-sectional view of a liquid crystal display device according to a first embodiment of the present invention.

A cross-sectional view of the liquid crystal display device fabricated by the method of manufacturing the liquid crystal display device as shown in FIGS. 8A–8E according to the first embodiment of the present invention is shown in FIG. 7, where the device is divided into a storage electrode part A, a thin film transistor part B, and a gate pad part C.

Referring to FIG. 7, the gate line 51 lies on the lower array substrate 50 in the storage electrode part A and the gate electrode 52 extends from the gate line 51 in the thin film transistor part B. The insulating layer 53 covers the entire surfaces of the storage electrode part A and the thin film transistor part B. The semiconductor layer 54 lies on a thin film transistor(T) forming area on the insulating layer 53 in the storage electrode part A. The semiconductor layer 54 is made up of the doped amorphous silicon layer 54b stacked on the amorphous silicon layer 54a. The source and drain electrodes 61 and 62 extend from a data line and overlap with both ends of the doped amorphous silicon layer 54b, respectively. In this case, the source electrode 61 extends from the data line, while the drain electrode 62 is separated from the source electrode 61 to be overlapped with one side of the gate electrode 52.

Besides, the opaque metal layer 60a, which is formed simultaneously when the source and drain electrodes 61 and 62 are formed, is overlapped with the gate line 51 on a front end as well as a pixel electrode. In this example, the opaque metal layer 60a is formed of Mo for the data line.

The passivation layer 64 covers the entire surface of the substrate having the opaque metal layer 60a and the source/drain electrodes 61 and 62 thereon. The first and second contact holes 65 and 67 expose predetermined portions of the drain electrode 62 and the opaque metal layer 60a, respectively.

As discussed above, each of the first and second contact holes 65 and 67 have step-like profiles differing in width from each other, thereby exposing at least in part both the lateral and upper surfaces of the opaque metal layer 60a and the drain electrode 62.

The insulating layer 53 is also provided in the gate pad part C on the substrate 50 including the gate pad 51a, and the passivation layer 64 is formed on the insulating layer 53 in the gate pad part C. The third contact hole 72 is formed on the substrate by etching the insulating layer 53 and the passivation layer 64 above the gate pad 51a.

Once the holes 67, 65 and 72 have been formed, the transparent conductive material such as ITO (Indium Tin Oxide) or other suitable material is deposited on the passivation layer 64 including the first and second contact holes 65 and 67, and then is patterned, thereby forming a pixel electrode 70 for a storage electrode Cst. Also, the transparent conductive material is deposited on the passivation layer 64 of the gate pad part C including the third contact hole 72, and is patterned, thereby forming a transparent conductive layer 70a.

As mentioned in the foregoing description, unlike the related art LCD devices, the liquid crystal display device according to the present invention increases the contact areas between the pixel electrode 70 and the opaque metal layer 60a and between the pixel electrode 70 and the drain electrode 62 to reduce contact resistance.

The storage-on-gate system is shown in the drawings, in which the lower electrode of the storage capacitor is built in one body with the gate line on the front end.

Accordingly, the liquid crystal display device and method of manufacturing the same according to the present invention has the following advantages or effects.

First of all, the present invention forms the step-like contact holes using the diffraction mask providing the diffraction of the slit pattern, thereby reducing or eliminating PDs (point defects) such as spots, weak spots, and the like caused by high Mo/ITO contact resistance of the related art LCD devices.

Therefore, the present invention provides stable electric contact between the storage and drain electrodes, thereby improving the image quality of the LCD device.

Second Embodiment

In order to prevent a contact resistance from increasing, a liquid crystal display device and a method for manufacturing the same according to a second embodiment of the present invention will be explained as follows.

FIGS. 10A to 10E illustrate cross-sectional views of an LCD device of the present invention cut along similarly to lines V–V' and VI–VI' of FIG. 1, for explaining a method of manufacturing the liquid crystal display device according to the second embodiment of the present invention.

Figure 10A:
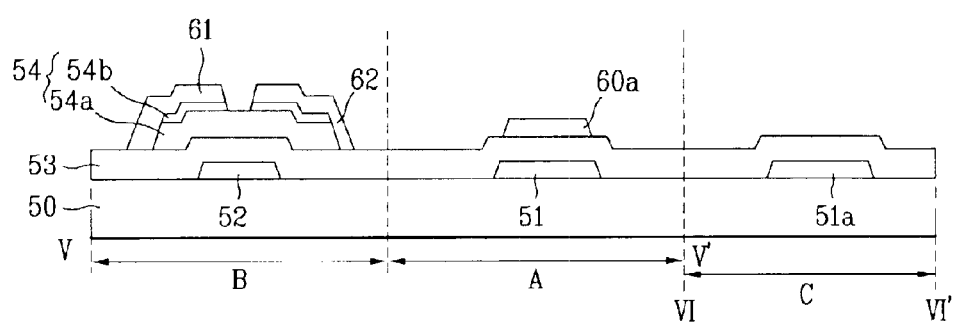
FIGS. 10A to 10E illustrate cross-sectional views of a method of manufacturing a liquid crystal display device according to the second embodiment of the present invention.
Figure 10B:
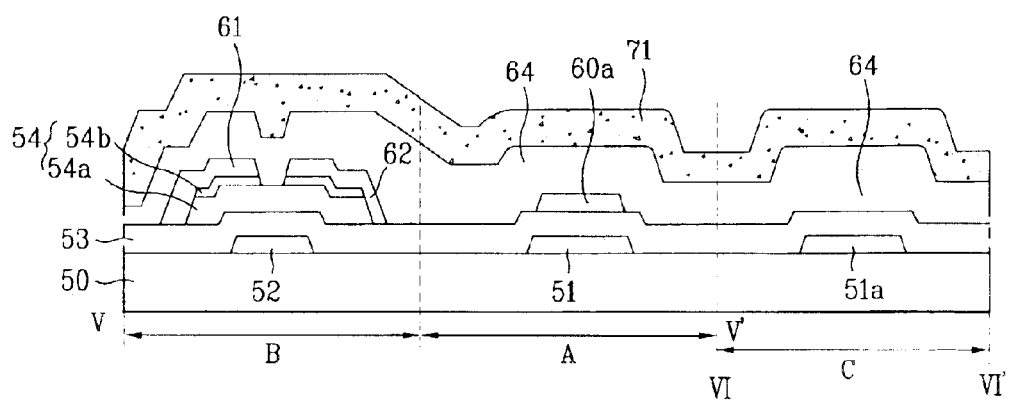

FIG. 10A and FIG. 10B are, respectively, the same as FIG. 8A and FIG. 8B illustrating the liquid crystal display device according to the first embodiment of the present invention. The same description applied to FIGS. 8A and 8B apply to FIGS. 10A and 10B and, thus, will be omitted at this time.

Figure 10C:
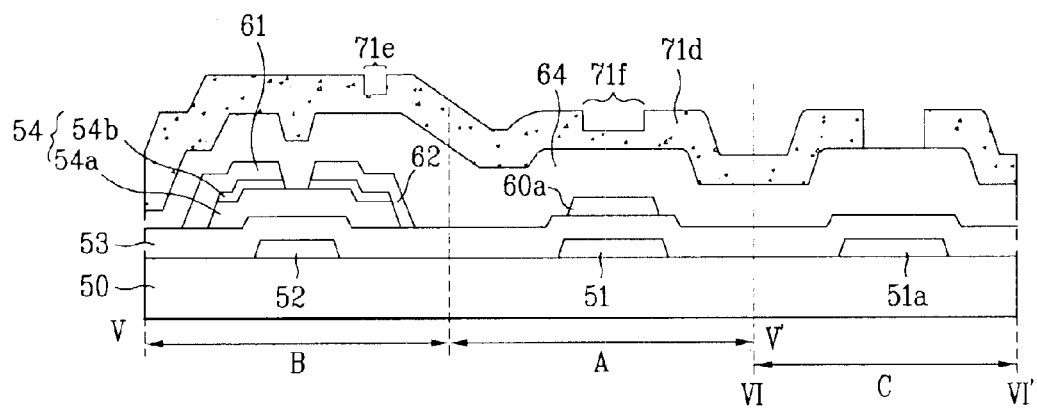

Referring to FIG. 10C, a photoresist pattern 71d is formed by using an exposing and developing process with a diffraction mask (e.g., half-tone mask, not shown). The photoresist pattern 71d is thinner in first and second areas 71e and 71f thereof compared to other areas thereof. The photoresist pattern 71d is also selectively removed above the gate pad 51a so as to expose a portion of the passivation layer 64 above the gate pad 51a. At this time, the first and second areas 71e and 71f respectively mean areas for forming first and second contact holes 65 and 67 above the opaque metal layer 60a and the drain electrode 62. The diffraction mask has slit patterns above the first and second areas 71e and 71f of the photoresist pattern 71d for forming the first and second contact holes 65 and 67. Here, compared to the areas 71b and 71c of the photoresist pattern 71a shown in FIG. 8C (first embodiment) which exposes portions of the passivation layer 64, the areas 71e and 71f of the photoresist pattern 71d in FIG. 10C do not expose any portion of the passivation layer 64.

Figure 10D:
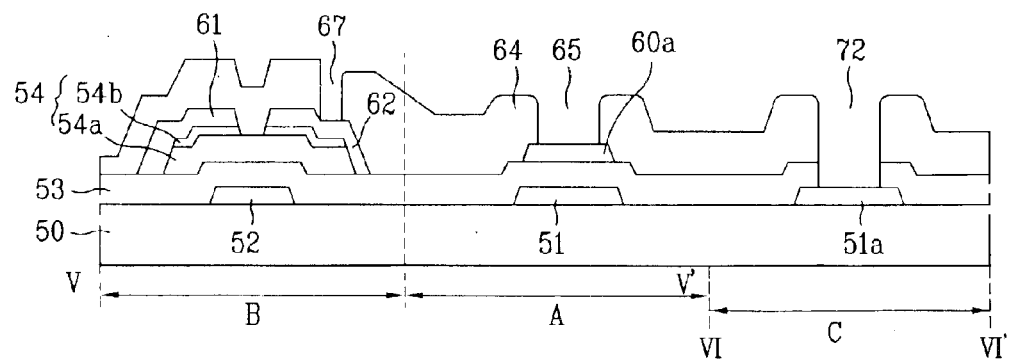

As shown in FIG. 10D, the first and second contact holes 65 and 67 are formed using the photoresist pattern 71d as a mask so as to expose portions of the opaque metal layer 60a and the drain electrode 62. During the formation of the first and second contact holes 65 and 67, the thinner portions of the photoresist pattern 71d at the areas 71e and 71f are etched along with the passivation layer 64 below those areas of the photoresist pattern 71d to expose portions of the drain electrode 62 and the opaque metal layer 60a, whereas the passivation layer 64 and the gate insulating layer 53 in the part C are simultaneously etched to expose a portion of the gate pad 51a.

Figure 10E:
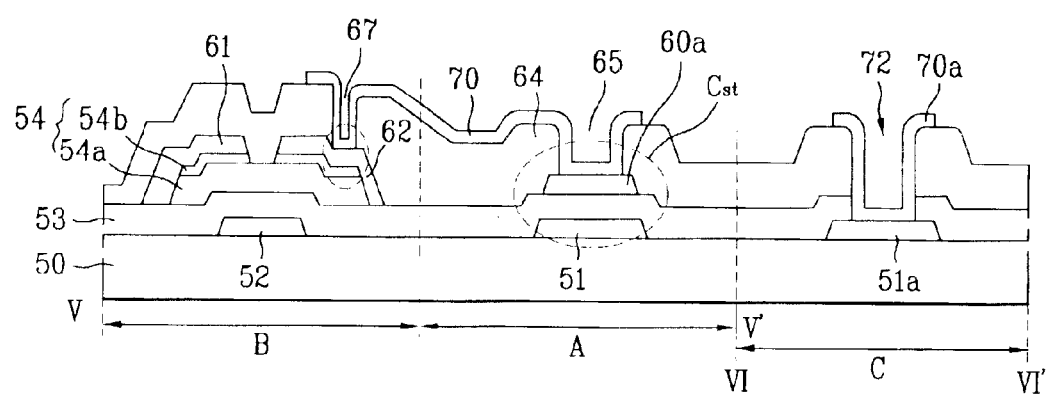

Referring to FIG. 10E, once the holes 67, 65 and 72 have been formed using the photoresist pattern 71d, the photoresist pattern 71d is removed. Then a transparent conductive material is formed on the passivation layer 64, the opaque metal layer 60a and the insulating layer 53 through the holes 67, 65 and 72. The deposited transparent conductive material is then patterned to form the pixel electrode 70 in the pixel area, and to form the transparent conductive layer 70a on the gate pad 51a. The pixel electrode 70 and the transparent conductive 70a may be formed of ITO or other suitable materials.

In the second embodiment, the pixel electrode 70 is in contact with the top or upper surfaces of the drain electrode 62 and the opaque metal layer 60a since the drain electrode 62 and the opaque metal layer 61a are not affected at those areas by the forming of the contact holes 67 and 65.

The liquid crystal display device and the method for manufacturing the same according to the second embodiment of the present invention have the following advantages.

During the process step for defining the first and second contact holes 65 and 67 and the gate pad 51a (the process step for forming the third contact hole 72), it is possible to prevent the opaque metal layer 60a and the drain electrode 62 from being etched at that time, thereby decreasing a contact resistance and PDs (point defects).

The LCD device according to the second embodiment of the present invention is generally the same as the LCD device according to the first embodiment of the present invention, except that the upper surfaces of the opaque metal layer 60a and the drain electrode 62 alone are exposed in the second embodiment, instead of exposing both the lateral and upper surfaces of the opaque metal layer 60a and the drain electrodes 62 as in the first embodiment of the present invention.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method of manufacturing a liquid crystal display device, comprising the steps of:

forming a metal layer on an insulating layer;

forming a passivation layer on the metal layer;

forming a photoresist pattern having an opening exposing a predetermined portion of the passivation layer and having a step-like pattern with at least two areas differing in thickness from each other;

forming a contact hole exposing portions of lateral and upper surfaces of the metal layer by selectively etching the passivation layer using the photoresist pattern as an etch mask;

removing the photoresist pattern; and forming a transparent conductive material to be in contact with the exposed portions of the lateral and upper surfaces of the metal layer through the contact hole.

2. The method of claim 1, wherein the metal layer is formed of Mo.

3. The method of claim 1, wherein the step of forming the photoresist pattern includes the steps of:

coating a photoresist layer on the passivation layer;

applying light beams to the photoresist layer using a diffraction mask having a predetermined slit pattern; and developing the photoresist layer to form the photoresist pattern.

4. The method of claim 1, wherein the passivation layer is etched by using a ($SF_e$+$Cl_2$) gas having an $O_2$ gas added thereto.

5. A method of manufacturing a liquid crystal display device, comprising the steps of:

forming a semiconductor layer over a gate line on a substrate;

forming source and drain electrodes overlapped with sides of the semiconductor layer and forming an opaque metal layer overlapped with the gate line;

forming a photoresist pattern having openings exposing predetermined portions of the passivation layer over the drain electrode and the opaque metal layer respectively, wherein the photoresist pattern has a step-like pattern with at least two areas differing in thickness from each other;

forming first and second contact holes exposing at least portions of lateral and upper surfaces of the opaque metal layer and the drain electrode respectively by selectively etching the passivation layer using the photoresist pattern as an etch mask;

removing the photoresist pattern; and forming a transparent conductive material to be in contact with the opaque metal layer and the drain electrode exposed through the first and second contact holes, respectively.

6. The method of claim 5, wherein the opaque metal layer, the source electrode, and the drain electrode are formed of Mo.

7. The method of claim 5, wherein the step of forming the photoresist pattern includes the steps of:

coating a photoresist layer on the passivation layer;

applying light beams to the photoresist layer using a diffraction mask having a predetermined slit pattern; and developing the photoresist layer to form the photoresist pattern.

8. The method of claim 5, wherein the passivation layer is etched by using a ($SF_6$+$Cl_2$) gas having an $O_2$ gas added thereto.

9. The method of claim 7, wherein a portion of the photoresist pattern under the slit pattern is thinner than other portions of the photoresist pattern.

10. The method of claim 9, wherein the thinner portion of the photoresist pattern is etched simultaneously when the passivation layer is etched in the step of forming the first and second contact holes.

11. The method of claim 5, further comprising:

forming an insulating layer between the gate line and the semiconductor layer.

12. A method of manufacturing a liquid crystal display device, comprising the steps of:

forming a gate line on a substrate;

forming a semiconductor layer over the gate line;

forming source and drain electrodes overlapped with sides of the semiconductor layer;

forming an opaque metal layer overlapped with the gate line;

forming a passivation layer on the substrate including the source and drain electrodes and the opaque metal layer;

forming a photoresist pattern having a step-like portion with thinner portions corresponding to first and second areas of the passivation layer;

forming first and second contact holes in the first and second areas of the passivation layer by using the photoresist pattern as a mask and thereby exposing portions of the opaque metal layer and the drain electrode;

removing the remaining photoresist pattern; and forming a transparent conductive material to be in contact with the opaque metal layer and the drain electrode exposed through the first and second contact holes, respectively.

13. The method of claim 12, wherein the step of forming the photoresist pattern includes the steps of:

coating a photoresist layer on the passivation layer;

performing an exposing and developing process to the photoresist layer using a diffraction mask having a predetermined slit pattern; and removing the photoresist layer corresponding to the first and second areas at a predetermined thickness to form the photoresist pattern.

14. The method of claim 12, further comprising:

forming an insulating layer between the gate line and the semiconductor layer.

* * * * *